United States Patent [19]

Cullen et al.

[11] 4,436,623

[45] Mar. 13, 1984

[54] ADSORBENT CARTRIDGE

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 402,756

[22] Filed: Jul. 28, 1982

[51] Int. Cl.$^3$ .......................................... B01D 27/08
[52] U.S. Cl. .................................. 210/282; 210/484; 210/DIG. 6
[58] Field of Search ............... 210/282, 287, 350, 351, 210/446, 484, DIG. 6, DIG. 7

[56] References Cited

U.S. PATENT DOCUMENTS

| | | | |
|---|---|---|---|
| 3,221,478 | 12/1965 | Norton | 210/282 |
| 3,407,936 | 10/1968 | Balogh | 210/282 |
| 3,785,497 | 1/1974 | Giffard | 210/282 |
| 3,799,352 | 3/1974 | McClive | 210/287 |
| 3,815,752 | 6/1974 | Hoffman et al. | 210/282 |
| 3,879,292 | 4/1975 | McClive | 210/DIG. 6 |

Primary Examiner—Ivars C. Cintins
Attorney, Agent, or Firm—Joseph P. Gastel

[57] ABSTRACT

An adsorbent cartridge for mounting in a housing including a casing consisting of an end wall and a cup-shaped member having a flexible substantially cylindrical wall, with the end wall and the cylindrical wall having their edge portions fused to each other to provide a radially outwardly extending rim for sealing engagement with the housing of a filter-drier, adsorbent in the housing, and the flexible cylindrical wall being adapted to bulge into sealing engagement with the housing when opposing forces directed toward each other are applied to the end wall and the bottom of the cup-shaped member. An adsorbent cartridge having the above structure and including an axially extending pipe fused to the end wall and the opposite end wall of the cup-shaped casing so as to provide an annular chamber for adsorbent, with the end walls extending radially inwardly beyond the pipe to provide rims for sealing engagement with a pipe member passing through the pipe of the adsorbent cartridge.

21 Claims, 12 Drawing Figures

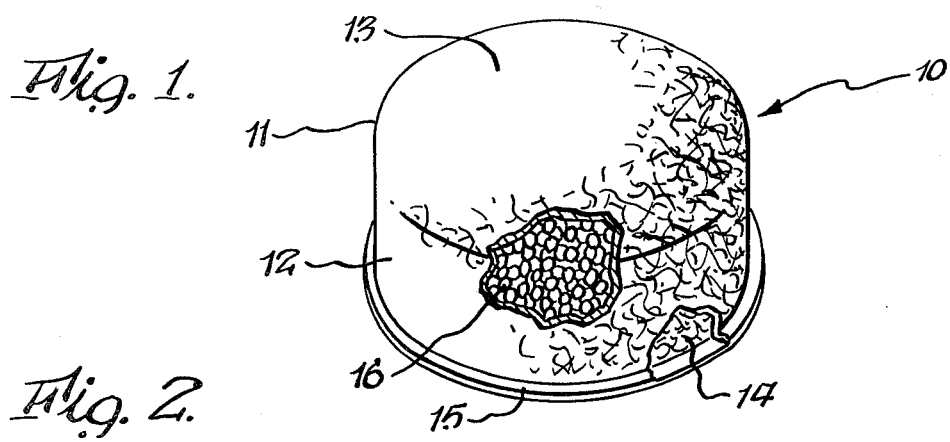
Fig. 1.
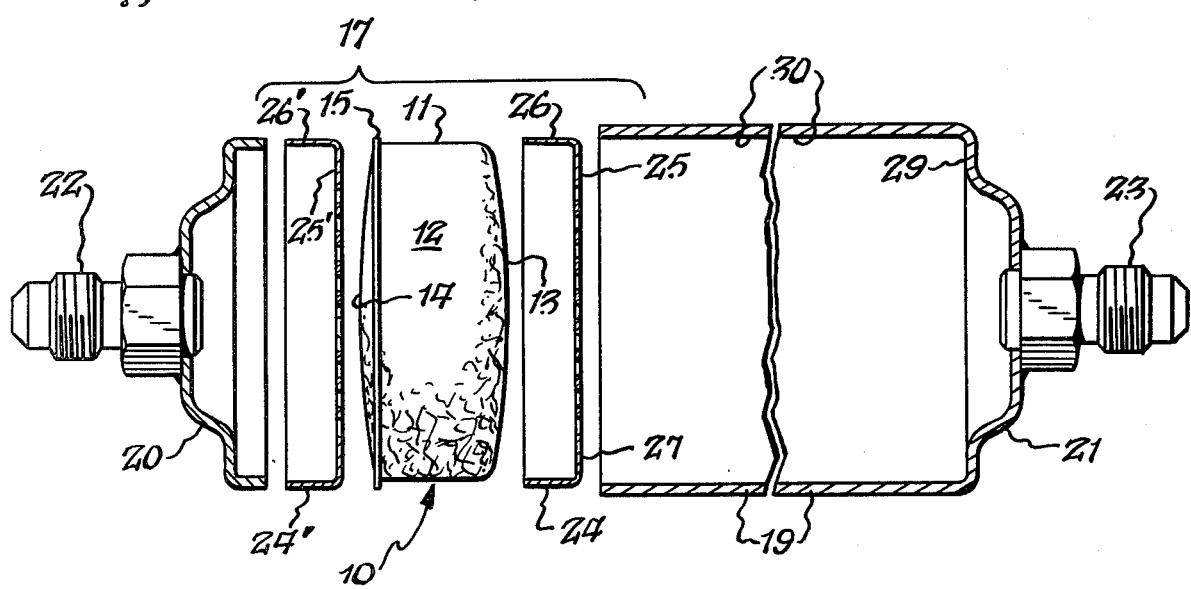
Fig. 2.
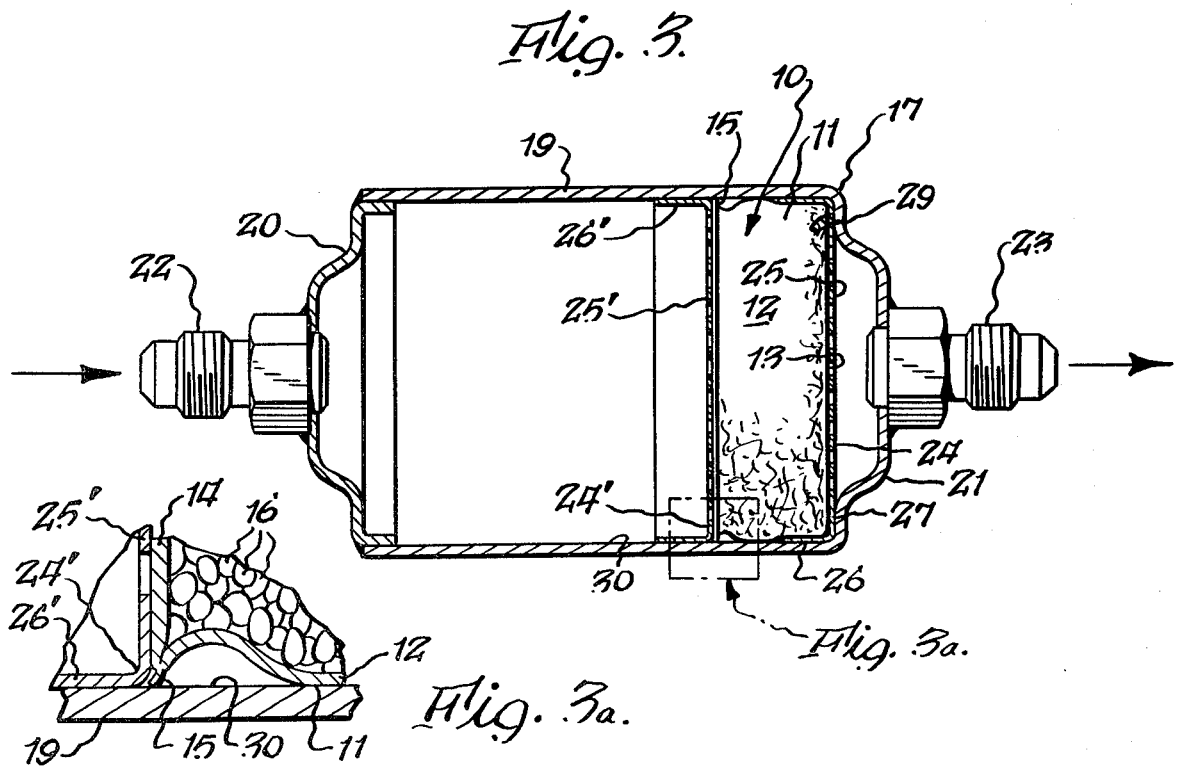
Fig. 3.
Fig. 3a.

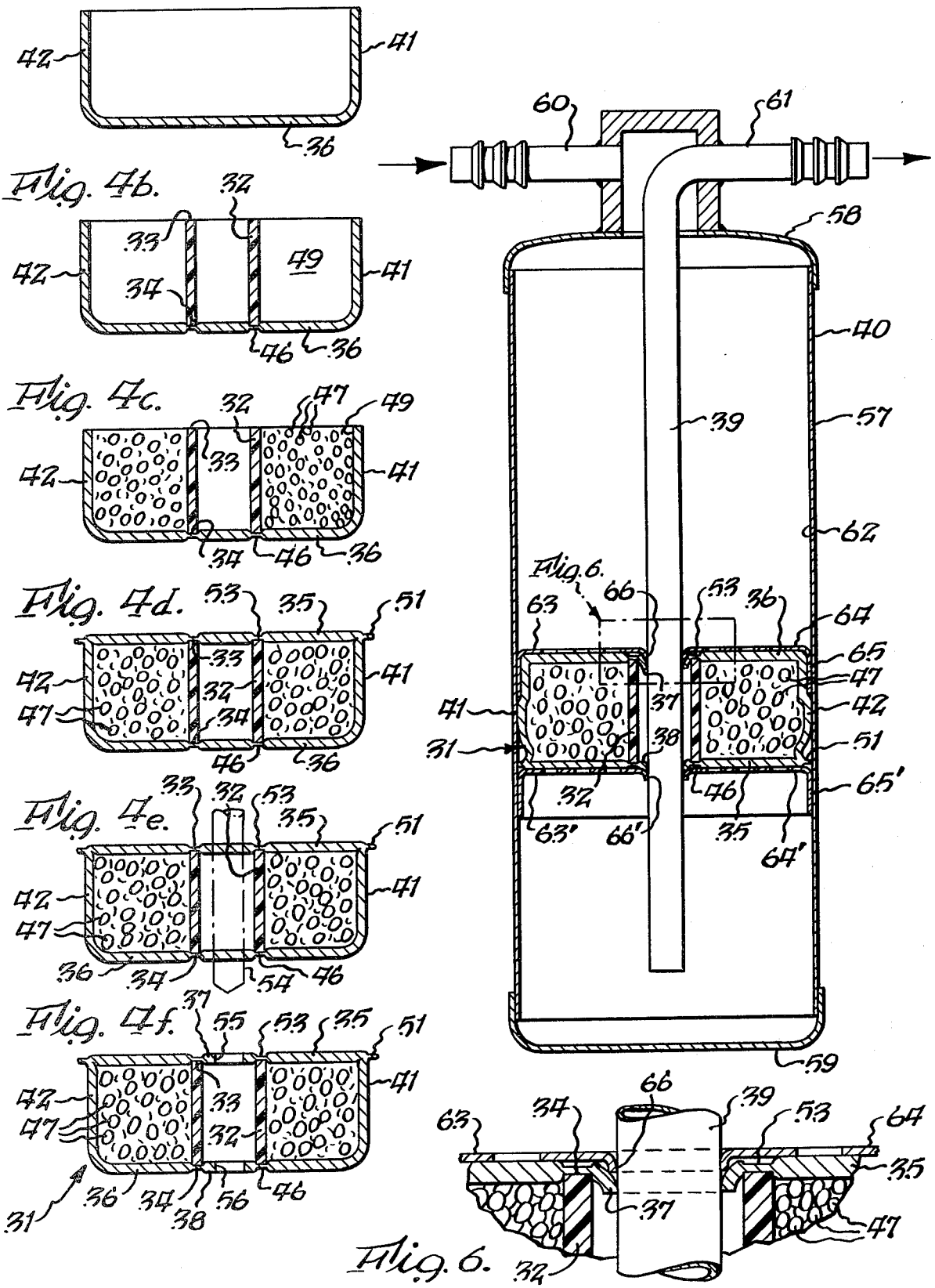

ADSORBENT CARTRIDGE

BACKGROUND OF THE INVENTION

The present invention relates to an improved adsorbent cartridge adapted to be mounted in a filter-drier of an air conditioning system.

By way of background, it is common practice to place an adsorbent device in a refrigerant-drier of an air conditioning system to adsorb undesirable substances from the refrigerant. In a prior device of this type, a housing of the type shown in the present application was filled with a combination of adsorbent pellets and fiberglass mesh which were tightly packed between metal grids press-fitted into the housing. The foregoing was expensive from both a labor and materials aspect. It is with overcoming the foregoing deficiency of prior devices that the present invention is concerned.

SUMMARY OF THE INVENTION

It is accordingly one object of the present invention to provide an improved adsorbent cartridge which can be installed in an existing refrigerant filter-drier housing construction in an extremely simple and expedient manner and which, in the installed position, will provide good sealing engagement with the housing. Other objects and attendant advantages of the present invention will readily be perceived hereafter.

The present invention relates to an adsorbent cartridge for mounting in a housing comprising a flexible porous casing including a flexible substantially cylindrical wall and a flexible porous first end wall at one end of said substantially cylindrical wall and a flexible porous second end wall at the opposite end of said substantially cylindrical wall, a rim formed by combining the edge portions of said substantially cylindrical wall and said second end wall, adsorbent in said casing, said rim extending radially outwardly from said substantially cylindrical wall to provide a seal with said housing, and said flexible substantially cylindrical wall being adapted to bulge outwardly into engagement with said housing when opposing forces are applied toward each other on said first and second end walls. The present invention also relates to a refrigerant filter-drier construction comprising a housing, first and second grid members in said housing, and an adsorbent cartridge having a flexible porous casing including adsorbent within a flexible substantially cylindrical wall pressed between said grid members with said substantially cylindrical wall bulged into sealing engagement with said housing.

The various aspects of the present invention will be more fully understood with the following portions of the specification are read in conjunction with the accompanying drawings wherein:

BRIEF DESCRIPTION OF THE DRAWINGS

FIG. 1 is a perspective view, partially broken away, of the improved adsorbent cartridge of the present invention;

FIG. 2 is a exploded cross sectional view of the improved adsorbent cartridge shown with respect to the various components of an existing refrigerant filter housing construction in which it is installed;

FIG. 3 is a cross sectional view of the improved adsorbent cartridge in its installed position;

FIG. 3a is a fragmentary enlarged cross sectional view of the portion of FIG. 3 designated FIG. 3a;

FIGS. 4a–4f, inclusive, show the steps of fabricating a modified form of adsorbent cartridge which is to be mounted in an existing filter housing of a refrigeration system;

FIG. 5 is a cross sectional view of the improved cartridge of FIG. 4f mounted in its operating environment; and FIG. 6 is a fragmentary enlarged cross sectional view of the area designated FIG. 6 in FIG. 5.

DESCRIPTION OF THE PREFERRED EMBODIMENTS

The improved adsorbent cartridge 10 comprises a porous fabric cup-shaped portion 11 having a substantially cylindrical wall 12 and an end wall 13 formed integrally therewith. A generally planar but slightly curved circular end wall 14 has its outer edge fused to the adjacent edge portion of cylindrical wall 12, by electrostitching or in any other suitable manner, to form a continuous annular fused rim 15 which projects radially outwardly from cylindrical wall 12. Suitable adsorbent 16, as described in greater detail hereafter, is contained within casing 11.

The adsorbent cartridge 10 is for use in a drier filter 17 having a cylindrical housing 19 and opposite end walls 20 and 21. Inlet coupling 22 and outlet coupling 23 are suitably secured to end walls 20 and 21, respectively. A dish-shaped metal grid member 24, having a circular perforated wall 25 and an upstanding annular rim 26, is press-fitted into housing 19 with its annular peripherial portion 27 against annular shoulder 29. Adsorbent cartridge 10 is positioned with its bottom wall 13 facing member 24. Another filter member 24', which is identical in all respects to filter member 24, is press-fitted into housing 19 at the position shown in FIG. 3. Thus, cartridge 10 is trapped between circular perforated portion 25 and identical circular perforated portion 25'. Because cartridge 10 is pressed between members 24 and 24', cylindrical wall 11 bulges into good sealing contact with the internal surface 30 of housing 19 to provide sealing therewith. In addition, the fused rim 15, which is stiffer than the fabric of wall 11 and end wall 14, will flex, as shown in FIG. 3a, to also provide a seal with surface 30. Housing 17 and members 24 and 24' form no part of the present invention other than in the novel manner in which they are combined with cartridge 10.

By way of dimensions, the internal diameter of housing 19 is 2.2 inches. The external diameter of cylindrical wall 11 is 2.2 inches before it is caused to bulge to the condition shown in FIG. 3. The outer diameter of end wall 14, including rim 15, is 2.5 inches. The distance between walls 13 and 14 is approximately 0.75 inches. Rim 15 extends outwardly approximately 0.1 inches from cylindrical wall 12.

In FIGS. 4–6 a modified embodiment of the present invention is disclosed. The adsorbent cartridge 31 differs from adsorbent cartridge 10 in that it includes a cylindrical pipe 32 having its opposite circular ends 33 and 34 fused to circular end walls 35 and 36, respectively. Furthermore, annular sealing rims 37 and 38 extend radially inwardly from pipe 32 to form seals with a pipe, such as 39, in refrigerant filter and drier 40, as shown in FIGS. 5 and 6.

The adsorbent cartridge 31 is fabricated by the steps shown in FIGS. 4a–4f, inclusive. First of all, a porous felted polyester cup-shaped member 41, having a cylindrical wall 42 and an integral end wall 43, is formed by a suitable pressing operation. Thereafter, the plastic pipe 32 has its lower end 34 fused to bottom wall 36 at circular portion 46 (FIG. 4b) by electrostitching or in any other suitable manner. Suitable adsorbent 47 is then poured into the annular trough 49 between pipe 32 and cylindrical wall 42. Thereafter, a circular end wall 35 is placed in the position shown in FIG. 4d and its outer edge is fused, by electrostitching or in any other suitable manner, to the outer edge of cylindrical wall 42 to form a continuous annular rim 51 which extends radially outwardly from cylindrical wall 42. In addition, the end 33 of pipe 32 is fused to end wall 36 to provide a continuous annular seam 53. Thus, the adsorbent 47 is completely sealed within the casing. Thereafter, a drill or punch 54 is utilized to provide circular holes 55 and 56 in the portions of end walls 35 and 36, respectively, leaving radially inwardly extending rims 37 and 38.

Adsorbent cartridge 31 is shown in installed condition in filter drier 40 having a cylindrical outer wall 57 and end walls 58 and 59 sealed thereto. Refrigerant enters housing 40 from conduit 60 and leaves it through conduit 61. The refrigerant is forced through adsorbent cartridge 31 which is mounted in sealing engagement with the inner surface 62 of wall 57. In this respect, a first cup-shaped grid member 63, having a perforated planar wall 64 and an annular upstanding rim 65, is press-fitted in the position shown in FIG. 5 with the inner annular edge 66 in engagement with pipe 39. Adsorbent cartridge 31 is positioned as shown in FIG. 5. Another member 63', which is identical in all respects to member 63, is press-fitted in the position shown in FIG. 5 so that the adsorbent cartridge 31 is firmly clamped between surfaces 64 and 64'. The clamping causes outer wall 42 to bulge into tight sealing engagement with inner wall 62 of housing 40. In addition, annular rim 51 also provides good sealing engagement with internal wall 62. As can be seen from FIGS. 5 and 6, annular rims 37 and 38 flex to provide good sealing engagement with pipe 39.

The dimensions of adsorbent cartridge 31 are as follows:

The outer diameter of cylindrical wall 42, before bulging outwardly, is 2.4 inches, and the outer diameter of the end wall 35, including rim 51, is 2.5 inches. The inner diameter of inner surface 62 is 2.4 inches and thus there is an interference fit between rim 51 and inner surface 62. Furthermore, when cylindrical wall 42 bulges outwardly, it will press against inner surface 62. The pipe 39 has an outer diameter of 0.375 inches and the diameter of holes 55 and 56 are 0.250 inches. The pipe 32 has an inner diameter of 0.440 inches and an outer diameter of 0.625 inches.

It can thus be seen that there are interference fits between various portions of the adsorbent cartridge 31 and the portions of pipe 39 and housing 40 with which there is engagement, to thereby provide the good sealing engagement discussed above. The fact that outer rim 51 is fused and is thus more rigid than the adjacent portions of the casing, will cause it to resist deflection due to the flow of liquids through housing 40. Housing 40 and grid members 64 and 64' form no part of the present invention other than in the novel manner in which they are combined with cartridge 31.

Casings of adsorbent devices 10 and 31 are preferably made from a porous thermoplastic sheet materials, such as felted polyester, which can have the various edges fused in the above described manner. By way of example and not limitation, a felted polyester which has been used is approximately 0.050 inches thick and has a weight of about 9.0 ounces per square yard. It will be appreciated that other polyesters of different thickness and other types of construction, such as spun-bonded, may be used. It will also be appreciated that the casings may be made out of any other suitable materials which are porous. Such materials will include plastic or natural fibers. While the walls of the different embodiments were attached to each other by electrostitching, it will be appreciated that may be joined by any other type of fusion, gluing, stitching, or in any other suitable manner. Furthermore, the pipe 44, as noted above, is made of a plastic which will fuse with the fusible plastic of the casing. However, if desired, the attachments may be made by gluing or in any other suitable manner.

The adsorbent in cartridges 10 and 31 may selectively include, without limitations, adsorbents, such as silica gel, metal alumino silicate, alumina, calcium sulfate, activated charcoal, molecular sieve, or any other desired compound in bead, pellet or granular form. However, for the present application in an air conditioning system, the molecular sieve is preferred.

While preferred embodiments of the present invention have been disclosed, it will be appreciated that the present invention is not limited thereto, but may be otherwise embodied within the scope of the following claims.

What is claimed is:

1. An adsorbent cartridge for mounting in a housing having a wall comprising a flexible porous casing including a substantially cylindrical flexible porous fabric wall and a flexible porous first end wall at one end of said substantially cylindrical wall and a flexible porous second end wall at the opposite end of said substantially cylindrical wall, a rim formed by combining the edge portions of said substantially cylindrical flexible porous fabric wall and said second end wall, adsorbent in said casing, said rim extending radially outwardly from said substantially cylindrical wall to provide a seal with said wall of said housing, and said substantially cylindrical flexible porous fabric wall being adapted to bulge outwardly into engagement with said wall of said housing to provide a seal therewith when opposing forces are applied toward each other on said first and second end walls.

2. An adsorbent cartridge for mounting in a housing having a wall as set forth in claim 1 wherein said casing is formed of fusible material, and wherein said rim comprises fused adjacent portions of said substantially cylindrical flexible porous fabric wall and said second end wall.

3. An adsorbent cartridge for mounting in a housing having a wall as set forth in claim 2 wherein said rim is stiffer than adjacent portions of said casing.

4. An adsorbent cartridge for mounting in a housing having a wall as set forth in claim 3 wherein said first end wall is formed integrally with said substantially cylindrical flexible porous fabric wall.

5. An adsorbent cartridge for mounting in a housing having a wall as set forth in claim 1 including a pipe portion having first and second ends and extending axially of said substantially cylindrical flexible porous fabric wall and between said first and second end walls, first and second securing means securing said first and second end walls to said first and second ends, respectively, and first and second open ends on said pipe portion for permitting mounting of said pipe portion on a pipe member.

6. An adsorbent cartridge for mounting in a housing having a wall as set forth in claim 5 wherein said first and second end walls comprise fusible material, and wherein said pipe portion comprises fusible material, and wherein said securing means comprises first and second fused seams between said first and second ends of said pipe and said first and second end walls, respectively.

7. An adsorbent cartridge for mounting in a housing having a wall as set forth in claim 6 including an extension of one of said first and second end walls extending radially inwardly of one of said first and second securing means for providing a second rim for effecting a seal with said pipe member.

8. An adsorbent cartridge for mounting in a housing having a wall as set forth in claim 7 including an extension of the other of said first and second end walls extending radially inwardly of the other of said first and second securing means for providing a third rim for effecting another seal with said pipe member.

9. A refrigerant filter-drier construction comprising a housing, first and second grid members in said housing, and an adsorbent cartridge having a flexible porous casing including a substantially cylindrical flexible wall and first and second opposed porous end walls, adsorbent completely enclosed within said flexible substantially cylindrical wall and said first and second porous opposed end walls, said cartridge being pressed between said grid members with said substantially cylindrical wall being bulged into sealing engagement with said housing.

10. A refrigerant filter-drier construction as set forth in claim 9 wherein said substantially cylindrical wall is fabricated from porous fabric.

11. A refrigerant filter-drier construction as set forth in claim 9 including an outwardly extending rim at the junction of said first end wall and an adjacent portion of said substantially cylindrical wall.

12. A refrigerant filter-drier construction as set forth in claim 11 wherein said outwardly extending rim is in sealing engagement with said housing.

13. A refrigerant filter-drier construction as set forth in claim 9 including a pipe extending between said first and second end walls, first and second ends on said pipe, seal means forming seals between said first and second ends and said first and second end walls, respectively, to provide an annular chamber for said adsorbent between said pipe and said substantially cylindrical wall.

14. A refrigerant filter-drier construction as set forth in claim 13 including an outwardly extending rim at the junction of said first end wall and an adjacent portion of said substantially cylindrical wall.

15. A refrigerant filter-drier construction as set forth in claim 14 wherein said outwardly extending rim is in sealing engagement with said housing.

16. A refrigerant filter-drier construction as set forth in claim 13 including a second pipe within said housing, and an extension of one of said first and second end walls extending radially inwardly of one of said first and second seal means for providing a rim for effecting a seal with a portion of said second pipe located within said pipe.

17. A refrigerant filter-drier construction as set forth in claim 16 including an outwardly extending rim at the junction of said first end wall and an adjacent portion of said substantially cylindrical wall.

18. A refrigerant filter-drier construction as set forth in claim 17 wherein said outwardly extending rim is in sealing engagement with said housing.

19. A refrigerant filter-drier construction as set forth in claim 16 including an extension of the other of said first and second end walls extending radially inwardly of the other of said first and second seal means for providing a second rim for effecting a second seal with said second pipe.

20. A refrigerant filter-drier construction as set forth in claim 19 including an outwardly extending rim at the junction of said first end wall and an adjacent portion of said substantially cylindrical wall.

21. A refrigerant filter-drier construction as set forth in claim 20 wherein said outwardly extending rim is in sealing engagement with said housing.

* * * * *